(12) United States Patent
Stenz

(10) Patent No.: US 6,754,637 B1
(45) Date of Patent: Jun. 22, 2004

(54) METHOD AND APPARATUS TO MANAGE NETWORK BASED RETURN PROCESSING

(76) Inventor: Brian G. Stenz, 355 Old School Rd., Gulf Stream, FL (US) 33483

(*) Notice: Subject to any disclaimer, the term of this patent is extended or adjusted under 35 U.S.C. 154(b) by 0 days.

(21) Appl. No.: 09/556,045

(22) Filed: Apr. 21, 2000

(51) Int. Cl.$^7$ .............................................. G06F 17/60
(52) U.S. Cl. .......................................... 705/26; 705/28
(58) Field of Search ........................... 705/1, 28, 2, 26; 707/104

(56) References Cited

U.S. PATENT DOCUMENTS

| | | | | |
|---|---|---|---|---|
| 6,026,374 A | * | 2/2000 | Chess | 705/26 |
| 6,085,172 A | * | 7/2000 | Junger | 705/28 |
| 6,269,344 B1 | * | 7/2001 | Junger | 705/28 |

OTHER PUBLICATIONS

Returns Online, Inc. company profile and origin, © 2000.*
http://www.returncentral.com Return Central.com Product Site.
http://www.returnsonline.com.
http://www.returnsonline.com/index.html.
http://www.returnsonline.com/rm.htm.
http://www.returnsonline.com/services.htm.
http://www.returnbuy.com/business ReturnBuy.com website.

* cited by examiner

*Primary Examiner*—Richard Chilcot
(74) *Attorney, Agent, or Firm*—Jon A. Gibbons; Fleit, Kain, Gibbons, Gutman, Bongini & Bianco P.L.

(57) ABSTRACT

A method in a client-server environment having a plurality of client systems coupled to a server over a network, the method on the return processing server for managing the return processing of one or more manufacturers. The method on the return comprising the steps of: coupling to a database containing information about the procedures for at least one manufacturer's product. The return server presents a return processing template to at least one client system coupled to the server system over a network, wherein the template comprises a graphical user interface for receiving information regarding at least one product to be submitted for return processing. The return processing server the information from the at least one client system of at least one product to be submitted for return processing. The return processing server creating a debit invoice in accordance with the manufacturer's policies for the information received for return processing from the at least one client system. Placing the debit invoice in a debit invoice database accessible to the one or more manufacturer's to access one or more debit invoices for processing return credit. And sending shipping information to the at least one client system for shipping the at least one product submitted for return processing. In another embodiment, the products being return are reviewed to determine if one or more products have a date associated with it for expiration. If the product is still usable, the product can be auctioned off or donated to charity. In still another embodiment, a system and computer readable medium for carrying out the above method.

21 Claims, 9 Drawing Sheets

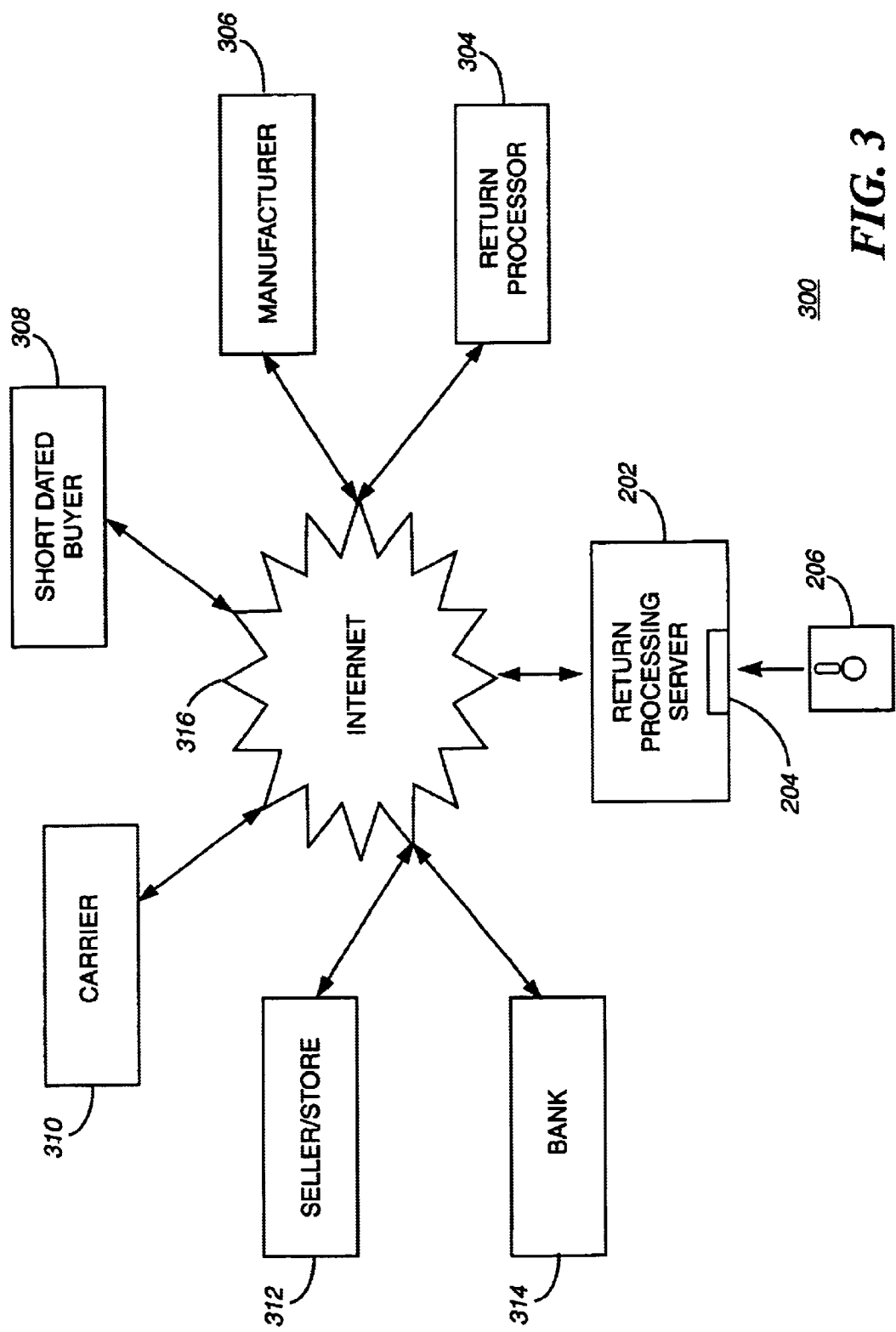

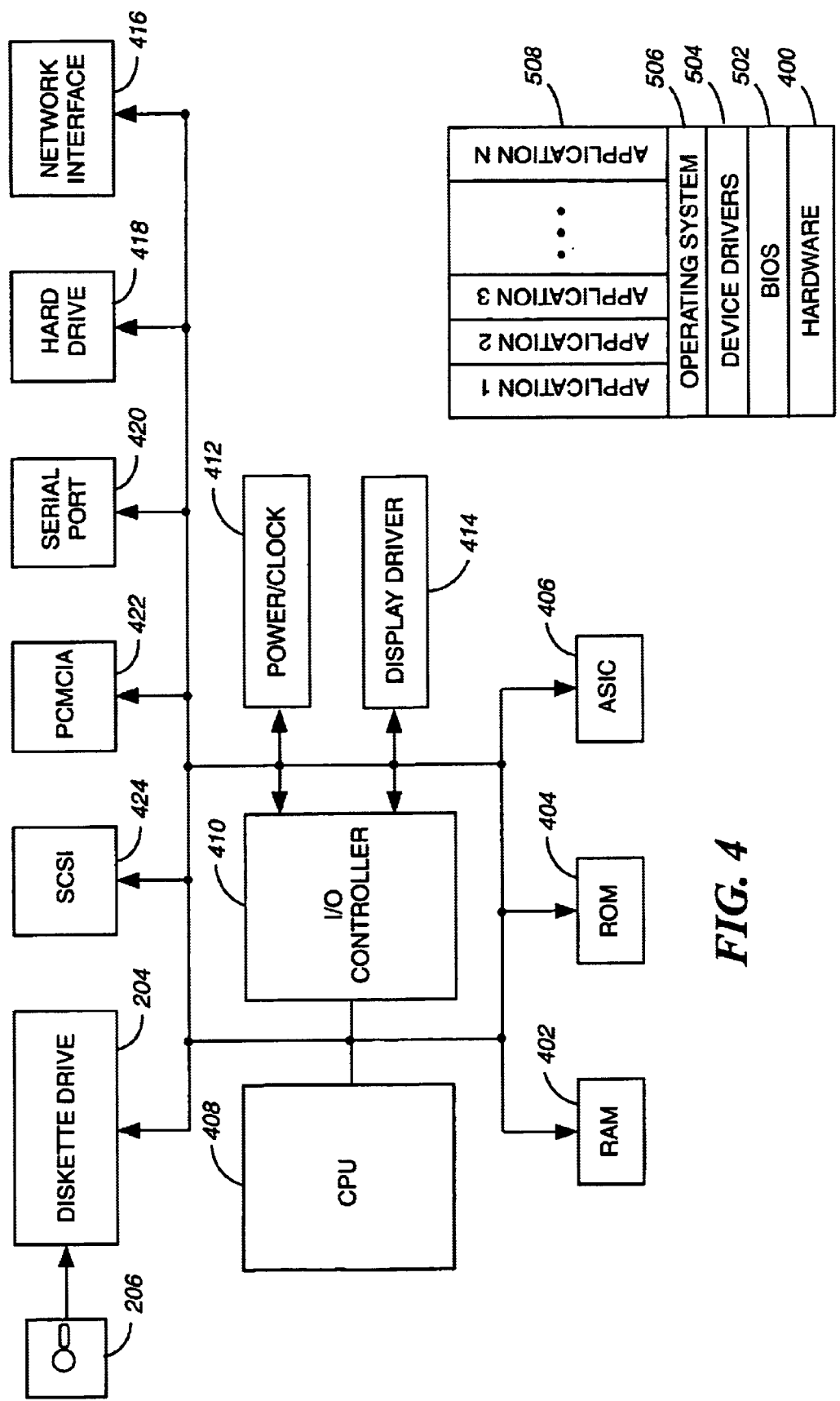

METHOD AND APPARATUS TO MANAGE NETWORK BASED RETURN PROCESSING

COPYRIGHT NOTICE

A portion of the disclosure of this patent document contains material which is subject to copyright protection. The copyright owner has no objection to the facsimile reproduction by any one of the patent document or the patent disclosure as it appears in the Patent and Trademark Office patent file or records, but otherwise reserves all copyright rights whatsoever.

BACKGROUND OF THE INVENTION

1. Field of the Invention

The invention disclosed broadly relates to the field of product reclamation, and more particularly relates to the field of disposition of products and goods using networks.

2. Description of the Related Art

The distribution chain of products from a manufacturer to the seller or store typically includes several intermediate entities. FIG. 1 is a block diagram 100 of a simple product distribution chain. A product produced at a manufacturer 108 is sent to a wholesaler 106 in large quantities for further distribution. The wholesaler 106 in turn redistributes products to chain distribution center 104. The chain distribution center 104 is a regional warehouse to divide the goods received from the wholesaler 106 into smaller lots as required by the store 102. This distribution chain can be greatly expanded by including multiple wholesalers as shown wholesaler 1→n 112 along with multiple chain distribution centers 1 →n 114 along with multiple stores 1→n 116.

Brand quality is important to manufacturers of products. Products that are damaged, outdated, expired, recalled, discontinued or unsaleable for any other reason is a concern for manufacturers. Unsaleable products can expose manufacturers to legal liability and may damage the manufacturer's reputation and goodwill. To increase the manufacturer's goodwill and to decrease any legal exposures, manufacturers must handle unsaleable products. Manufacturer control the return processing to ensure the complete removal of the product from the distribution channel and managed the reclamation flow.

If the store 102 has an unsaleable product that needs to be disposed, the store typically ships the product back to a reclamation center 110. Any credits for the returned products are sent back to the store 102 from the reclamation center 110.

Manufacturers often run return centers that must inventory returned and unsaleable products, match the unsaleable products for any claims data for payments. The process of tracking each product returned is tedious and prone to errors. The seller not only has to "sweep" their shelves and inventory occasionally for products to return but arrange for shipping and financial tracking as well. The number of products of inventory handled can be large from hundreds to thousands of products. Products returned must be tracked not only by product name, but other information must also be supplied, such as the model number if any and serial number and tag number distinguished. Because all the products in inventory are not from one manufacturer, the problem of tracking and handling returns from multiple manufacturers becomes even more complicated. Not only does each product have different return policies, but each manufacturer may have different return policies for the same product. The processing returns for multiple manufacturers each with distinct return policies and perhaps distinct reporting formats makes the process of tracking products even more tedious and prone to errors.

To help with the return processing, several companies have begun offering services to aggregate all of the returns processing for the Chain distribution center 104 and stores 102. One such return aggregator is USF Processors of Dallas Tex., or Universal Solution International Inc, of Winston Salem, N.C., or Pharmaceutical Processing Headquarters of Conyers Ga.

USF offers a service of receiving the returned products from the stores 102, identifying which store returned what product to the manufacturers 108 (where appropriate) for receipt of return payment, if any. The return payment is sent to the corresponding store 102. The return processing aggregation is sometimes thought of as a "reverse checkout process" because like the store "check out," products shipped to the aggregators are scanned" into the system at the reclamation center 110. But unlike the "check out" process the products are not in inventory for sale but in inventory for return and disposal. The aggregators typically take a percentage of the money paid by the manufacturers as a fee for processing the products for the stores.

These reclamation centers 110 and aggregator although useful, are not without their shortcomings. One shortcoming with the current aggregator system, is that the store must be associated with a large network of stores such as a chain to take advantage of services such as return processing aggregators. The attendant paper work for return processing is onerous. In addition, the return and disposal of many products are regulated under state and federal agencies such as the FDA (Food and Drug Administration), EPA (Environmental Protection Agency) and the PDMA (Pharmaceutical Drug Market Act). The rules that sellers 102 and reclamation centers 110 must abide by are complex. Rules are even more complex with highly regulated products such as drugs, pharmaceuticals, hazardous waste, biological products and environmentally hazardous products such as nuclear products. Accordingly, a need exists for a method and apparatus to permit stores of any size, even the small "Mom and Pop" stores, to efficiently return products for processing while complying with the numerous government regulations.

Another shortcoming with the use of return processing centers 110 or aggregators is that many stores that sell pharmacies are not EPA regulated. Accordingly the disposal of stores trying to dispose of or return products regulated by the EPA must use reclamation centers 110 or aggregators that are EPA compliant.

Another shortcoming with the use of return processing centers 110 or aggregators is that the processing of payments can take a long time. The return processing aggregators must receive the product, notify the manufacturer 108 or wholesaler 106, invoice the manufacturer or wholesaler for payment and finally receive payment from the manufacturer and pay the store. This payment process many times takes three to six months to complete. The delay in processing credit and payments can be substantial and for large stores the accounts receivable for a return processing inventory can run into the millions of dollars. In addition, several state governments, such as Pennsylvania, require stores to pay taxes on inventory, even though the inventory may be unsaleable and slated to be returned. It is not until the return credit is issued that the tax liability of unsaleable inventory is eliminated. Accordingly, a need exists for a method and apparatus to expedite the processing of payments to sellers for products disposed.

Still, another shortcoming with the use of return processing centers 110 or aggregators is the inability to efficiently handle "short-dated" inventory. Short-dated inventory is inventory that has not expired yet, but will expire within a few weeks or months. Short-dated inventory can be a large problem in such diverse industries such as pharmaceuticals and food. Although in many instances manufacturers or wholesalers will not accept short-dated inventory until the inventory expires, there is an after market for short-dated products. Moreover, many times, stores 102 and manufacturers 108 want to donate short-dated products for tax credits. Accordingly, a need exists for a method and system to handle the processing of short-dated products for resale and donation.

SUMMARY OF THE INVENTION

Briefly in accordance with the invention, a method in a client-server environment having a plurality of client systems coupled to a server over a network, the method on the return processing server for managing the return processing of one or more manufacturers. The method on the return comprising the steps of: coupling to a database containing information about the procedures for at least one manufacturer's product. The return server presents a return processing template to at least one client system coupled to the server system over a network, wherein the template comprises a graphical user interface for receiving information regarding at least one product to be submitted for return processing. The return processing server the information from the at least one client system of at least one product to be submitted for return processing. The return processing server creating a debit invoice in accordance with the manufacturer's policies for the information received for return processing from the at least one client system. Placing the debit invoice in a debit invoice database accessible to the one or more manufacturer's to access one or more debit invoices for processing return credit. And sending shipping information to the at least one client's system for shipping the at least one product submitted for return processing.

In another embodiment, the products being returned are reviewed to determine if one or more products have a date associated with it for expiration. If the product is still usable, the product can be auctioned off or donated to charity.

In still another embodiment, a system and computer readable medium for carrying out the above method.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention will be apparent from the following detailed description taken in conjunction with the accompanying drawings.

FIG. 3 is a block diagram of the major sites through wish information is exchanges with the return processing system of FIG. 2, according to the present invention.

FIG. 4 is a block diagram of the major electrical components of an information processing system (server) according to the present invention.

FIG. 5 is a block diagram illustrating the software hierarchy for the information processing system (server) of FIG. 3 according to the present invention.

DETAILED DESCRIPTION OF AN EMBODIMENT

It is important to note that these embodiments are only examples of the many advantageous uses of the innovative teachings herein. In general, statements made in the specification of the present application do not necessarily limit any of the various claimed inventions. Moreover, some statements may apply to some inventive features but not to others. In general, unless otherwise indicated, singular elements may be in the plural and vice versa with no loss of generality.

Glossary of Terms Used in this Disclosure database—any file format which information and data can be stored and retrieved by one or more users. The database can be implemented as one physical file or broken into separate databases such as a shipping database, a donation database, an auction database, a price database, a manufacturer's return goods policy database, wholesale database, manufacturers database and so on.

debit invoice—a document showing the reason and the authorization for creating a debit. The debit invoice may contain an itemized list of products to be returned with payment information associated with it.

disposal—the process to removing a product from inventory usually for credit or tax credit. The process of removing includes burning, destruction, break down for recycling, donation, return to stock, refurbished or remanufacturing, or throwing into refuse.

information processing system—a system capable of processing data and information and integrated with processes such as office automation and data communication. An information processing system can be embodied in a variety of hardware such as a PC, or microprocessor-based system.

operating system—software that controls the execution of programs and that may provide services such as resource allocation, scheduling, input/output control, and data management and administration. Although operating system are predominately software, partial hardware implementations are possible.

Short-dated product—is a product that has not expired yet and has some useful life, but will expire within a few weeks or months.

unsaleable product—a product needing disposal by an entity such as a store, seller, or sales representative.

Exemplary Return Processing Server

Figure 1:
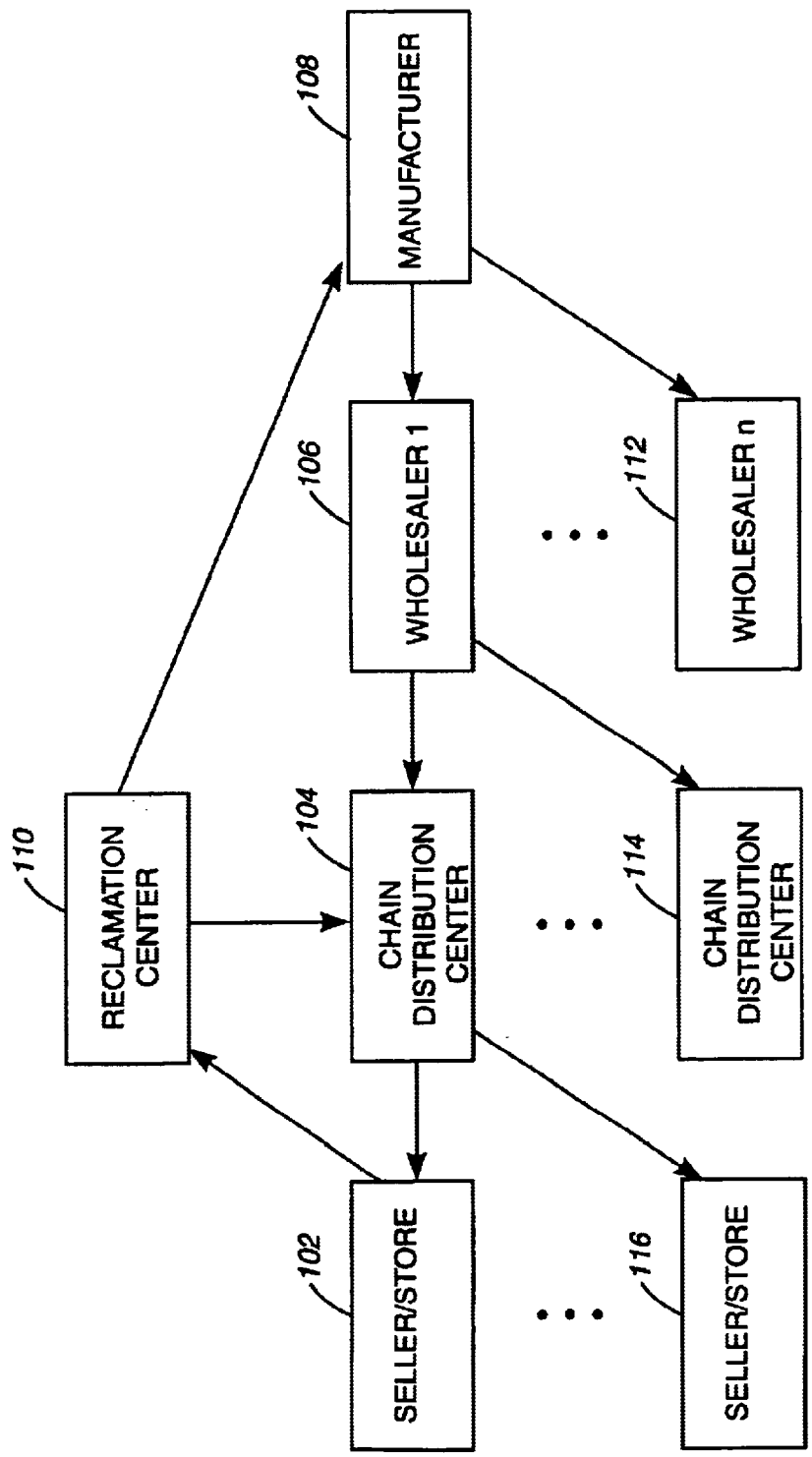
FIG. 1 is a prior art block diagram of a simple product distribution chain.
Figure 2:
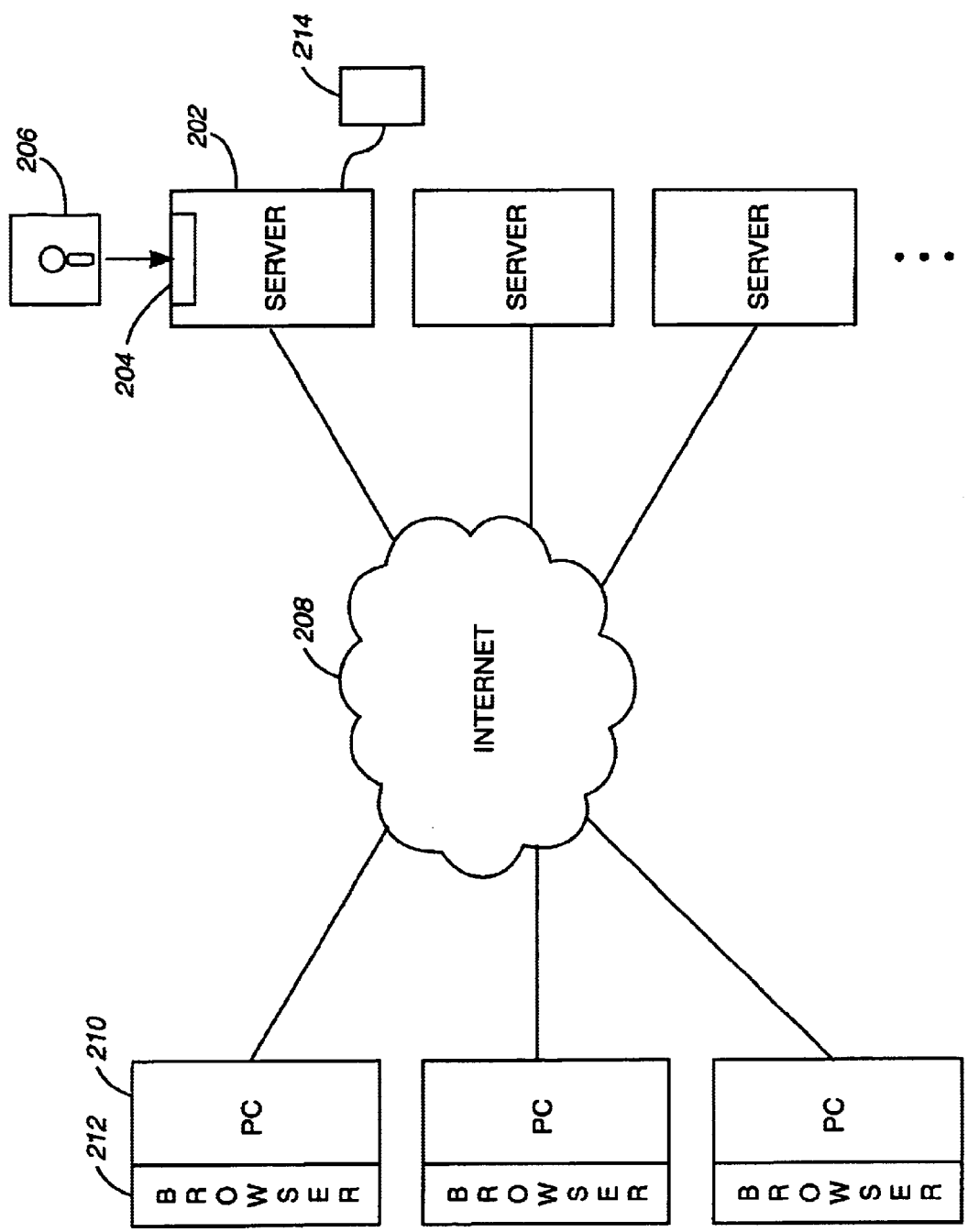
FIG. 2 is a block diagram of a client-server system for carrying out this present invention.

FIG. 2 is a block diagram of a return processing server architecture 200 for carrying out this present invention. An e-commerce server information processing system 202 such as a PC server such as those available from IBM and Compaq or a server from Sun Microsystems or equivalent. The server 202 has an interface 204 for reading programming information from a computer readable medium 206 such as a floppy diskette, CD ROM, DVD ROM, Flash Memory or other removable computer readable medium. Each server is coupled to one or more databases 214 such as IBM's DB/2, Microsoft Access, Oracle or equivalent. The return processing server 202 is linked to a plurality of other information processing systems over a network 316 such as a LAN, WAN, Internet, broadcast infrastructure, public switch telephone networks or through any other computer readable medium. Each of these other information processing systems 300 are now described in turn below with reference to FIG. 3.

Bank 314 is the entity which provides credit and payment information from the manufacturer 306 (or wholesaler) and the seller store 312. This credit can be through funds transfer mechanisms such as ACH transfers, wire transfers, checks and other credit vehicles.

Seller/Store 312 is the entity wishing to send a product for return processing. In a pharmaceutical embodiment, the store is the pharmacy and the product is a pharmaceutical. In another pharmaceutical example, the seller is a sales representative that is returning "sales samples".

Carrier 310 the entity that ships products from the seller/store 312 to either the short-dated buyer 308, the wholesaler 306 (or manufacturer), the return processor 304. The carrier can be FedEx™, the U.S. Postal Service, Airborne™, DHL™, RPS™ or some other third party shipper.

Short-dated Buyer 308 is an entity that may purchase a short-dated product from the seller/store 312.

Manufacturer (Wholesaler) 306 is the entity that purchases and handles large lots of merchandise from the manufacturer (not shown) for distribution usually at a lower price.

Return Processor 304 is the entity that disposes of a returned product from a seller's inventory through burning, destruction, donation, return to stock, refurbished or re-manufacturing, or throwing into refuse.

Return Processing Server 202 is the entity that coordinates the returns of products from the sell/store 312 with all the other systems 304, 306, 308, 310 and 314 and entity that directs the primary process flows of this present invention.

Although all of these systems 202, 304, 306, 308, 310, 312 and 314 are shown interconnected via a network 316, such as the Internet, any and all of these systems can be connected through the exchange of other computer readable medium such as floppy diskettes 206, DVDs, CDs and flash memory cards.

Exemplary Return Processing Server Hardware

Referring to FIG. 4, there is shown a block diagram of the major electrical components of an information processing system 400 of the return processing server 402 in accordance with this invention. The electrical components include: a central processing unit (CPU) 408, an Input/Output (I/O) Controller 410, a system power and clock source 412; display driver 414; RAM 402; ROM 404; ASIC (application specific integrated circuit) 406 and a hard disk drive 418. These are representative components of a computer. The operation of a computer comprising these elements is well understood. Network interface 416 provides connection to a computer network such as Ethernet running TCP/IP or other popular protocol network interfaces. Optional components for interfacing to external peripherals include: a Small Computer Systems Interface (SCSI) port 424 for attaching peripherals; a PCMCIA slot 424; and serial port 420. An optional diskette drive 204 is shown for loading or saving code to removable diskettes 206 or equivalent computer readable media.

Exemplary Software Hierarchy for Commerce Server

FIG. 4 is a block diagram illustrating the software hierarchy for the information processing system of FIG. 3 according to the present invention. The hardware 400 is the information processing system of FIG. 2. BIOS (Basic Input Output System) 402 is a set of low level of computer hardware instructions, usually stored in ROM 404, for communications between an operating system 506, device driver(s) 504 and return processing server 202. Device drivers 404 are hardware specific code used to communicate between and operating system 506 and hardware peripherals such as a mouse, CD ROM drive or printer. Applications 508 are software application written in C/C++, Java, assembler or equivalent. Operating system 506 is the master program that loads after BIOS 502 initializes, that controls and runs the return processing server 202. Examples of operating systems include DOS, Windows 3.1/95/98/NT, Linux, Unix, Macintosh, OS/2 and equivalent. In one embodiment, the return processing system an application 408 that resides on the return processing server 202 and communicates with systems 304, 306, 308, 310, 312 and 314 over the network 316.

The return processing server 202 may be implemented by combination of hardware and software. Moreover, the functionality required for using the invention may be embodied in computer-readable media (such as 3.5 inch diskette 206) to be used in programming an information-processing apparatus (e.g., a personal computer) to perform in accordance with the invention. Computer program means or computer program in the present context mean any expression, in any language, code or notation, of set of instructions intended to cause a system having an information processing capability to perform a particular function either directly or after either or both of the following: a) conversions to another language, code or notation; b) reproduction in a different material form.

Exemplary Return Processing Site Map

Figure 6:
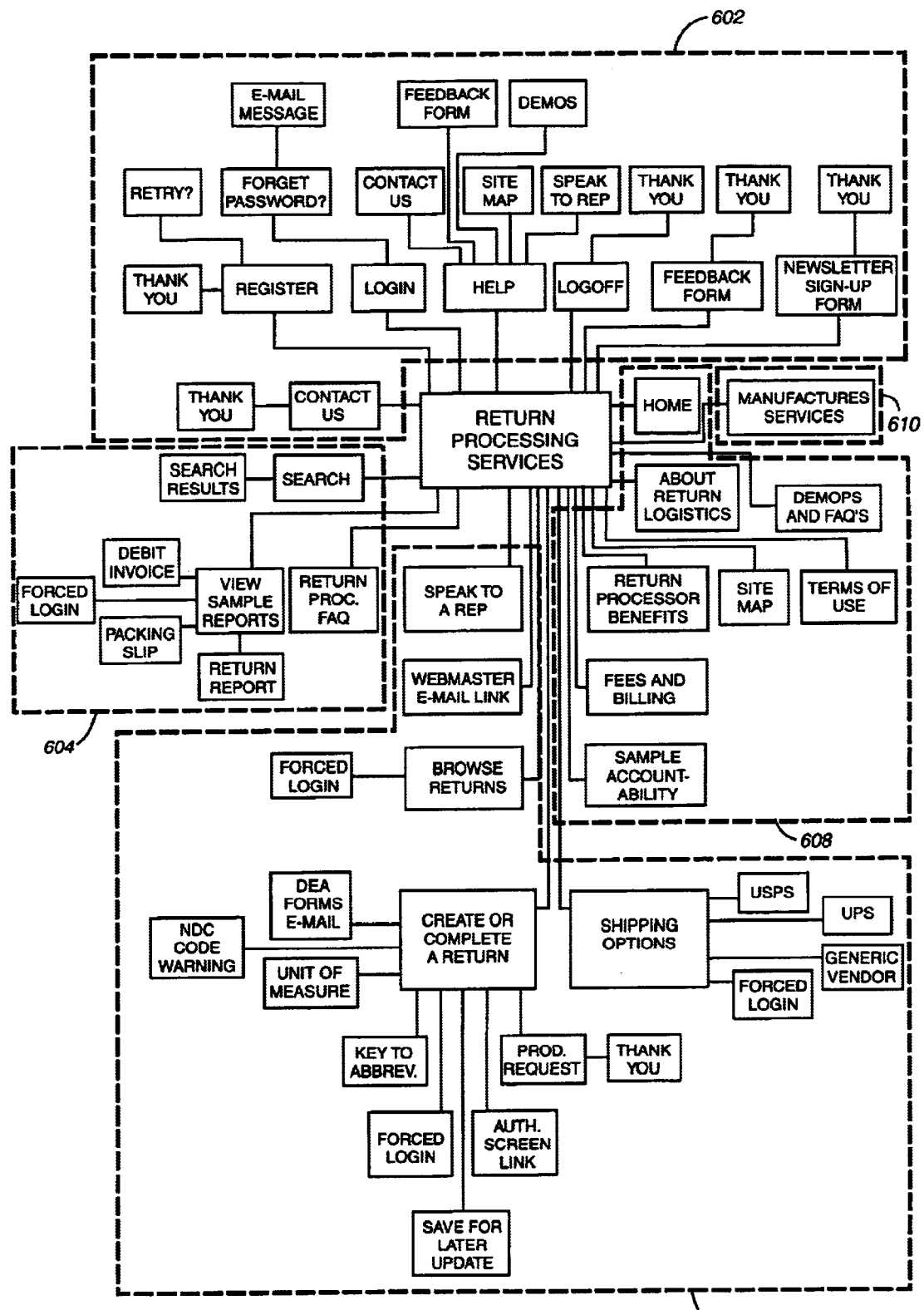
FIG. 6 is a block diagram of the over all site-map of the return processing system server, according to the present invention.

FIG. 6 is an exemplary block diagram of the overall site map 600 of the return processing system server, according to the present invention. The site map is described in groups:

A login/register/logoff group/contact us group 602. This group 602 allows a store 312 and individuals using the site to setup accounts and passwords using method known to those in the art of e-commerce;

A search group 604, enables a store 312 registered with the site 600 to view reports of returns that are submitted for processing as further illustrated in FIG. 10 below;

A return group 606, allows a store 312 using a graphical user interface to create a return processing slip as is discussed in FIG. 6 below. In a pharmaceutical embodiment for returning products, a DEA (Drug Enforcement Agency) guidelines, FDA (Food and Drug Administration) and other government agency guidelines;

A promotional group 608 to provide information about the return processing services offered through the site 600; and A manufacturer's services 610 group provides information between the various manufacturers 306 and stores 312 through the site 600. The manufacturers use this portion of the site 600 to authorize the debit invoices and to process payment directly or through a representative such as a bank 314. This is described further in FIG. 10 below.

Exemplary Return Processing GUI

Figure 7:
FIG. 7 is an exemplary graphical user interface for creating a return processing slip, according to the present invention.

FIG. 7 is an exemplary graphical user interface for creating a return processing slip 700, according to the present invention. There are three main areas in the slip 700. A search area 702, a results area 708 and the details area 710. These areas correspond to the search group 504 of site map 6.

The search area 702 is a set of fields for a store 313 to enter information into a graphical user interface through a browser 112. The fields allow the searching of the database 214 coupled to server 202. Two fields are shown a product code 704, such as a UPC (Universal Product Code) or NDC (National Drug Code) 704. In addition, if the store 312 does not use product codes for field 704, a product name can be entered in field 706. One either a product code entry 704 or a product name 706 is entered. The database 214 for the manufacturer's products is searched coupled to the server 202. The results of the search are shown in area 708. The user can review product details in area 710. There are several fields in area 710 which are now described. Each of these fields is pulled from the search criteria 704 and 706 from the database 214 for the manufacturer:

Field 712 is the name of the product from the search results area 708.

Field 714 is the reason for return. In one embodiment, this is a pull-down menu such as damaged product, returned product, expired product, and others.

Field 716 is the return policy for this product.

Field 718 is a strength (if applicable) such as for a pharmaceutical.

Field 720 is the size of the product returned.

Field 722 is the lot or batch number.

Field 724 is the estimated return value (ERV). This is described in the in the glossary section 742.

Field 726 is the expiration date. This date is key for short-dated products.

Field 728 is the quantity of products returned.

Field 730 is an indication if the return is full or partial. A glossary is shown below 742 to help the user.

Field 732 is the disposition choices, such as return for credit, ship to a return processor 304, allow the short-dated product to be auctioned or donated. Instructions for disposition are shown below in area 740.

Field 734 is whether the seller can modify or delete these entries in the product details 710.

Below the product detail area 710 are a set of buttons search another product 736, save for later update 738 and return process 740 to enable the personnel from the store 312 to provide the next step during the return processing.

Exemplary Return Processing GUI

Figure 8:
FIG. 8 is an exemplary user interface for authorizing a debit invoice, according to the present invention.

FIG. 8 is an exemplary user interface 800 for authorizing a debit invoice, according to the present invention. A manufacturer 306 (or agent of a manufacturer) reviews the return processing slip created in FIG. 6, once submitted with process return button 638. There are two primary areas a search area 802 and the results area 820.

The search area 802 has several fields. Input can be made to any or all of these fields as desired by which will now be described.

Field 804 is the date of the return entered by the store 312 into the database 214.

Field 806 is the store 312 (or company) returning the product.

Field 808 is the destination company used for disposition, auction or donation destinations.

Field 810 is the destination of a city for the company of Field 808.

Field 812 is the destination state of the destination company of Field 808.

Field 814 is the manufacturer's product code.

Field 816 is the manufacturer's authorization number for the authorized debit invoice. This is sometimes called a RMA (return material authorization).

Field 818 is the credit memo field (if applicable) for a bank 314 to credit the seller 312.

Three buttons, search 818, find all 820 and clear 822, complete the search area 802. The search results 820 area shows the results from database 214 that match the search from search area 802. Several fields are shown as the result of the search 802. A product code field 822, a quantity 824, a unit of measure 826, a product name 828, a lot/batch 830, an expiration date 832, a reason for return 834, a estimated return value 836, and an actual return value 838 are displayed. The estimated return value 836 or ERU is an estimated return value of a product based on the average wholesale price. This is an amount suggested to the manufacturer 306 for return credit. The actual return value 838 or ARV is the actual amount credit by the manufacturer 306 to the seller/store 312.

Exemplary Return Processing GUI

Figure 9:
FIG. 9 is an exemplary user interface for reviewing products previously submitted in FIG. 7 for return processing, according to the present invention.

FIG. 9 is an exemplary user interface 900 for reviewing products for return previously submitted in FIG. 6 for return processing, according to the present invention. There are two main sections to return products interface comprising a report and shipping section 902 and a detail section 910. In the report and shipping section 902, a report icon 904, shipping label 906, and shipping confirmation button 908 are presented. The shipping label 906 creates a shipping label for the carrier 310. The shipping confirmation button 908 updates the database 214, that a return product is ready for shipping. The detail section 910 shows the details for the returns submitted for processing that are in the database 214.

Exemplary Manufacturing Service Site-Map

Figure 10:
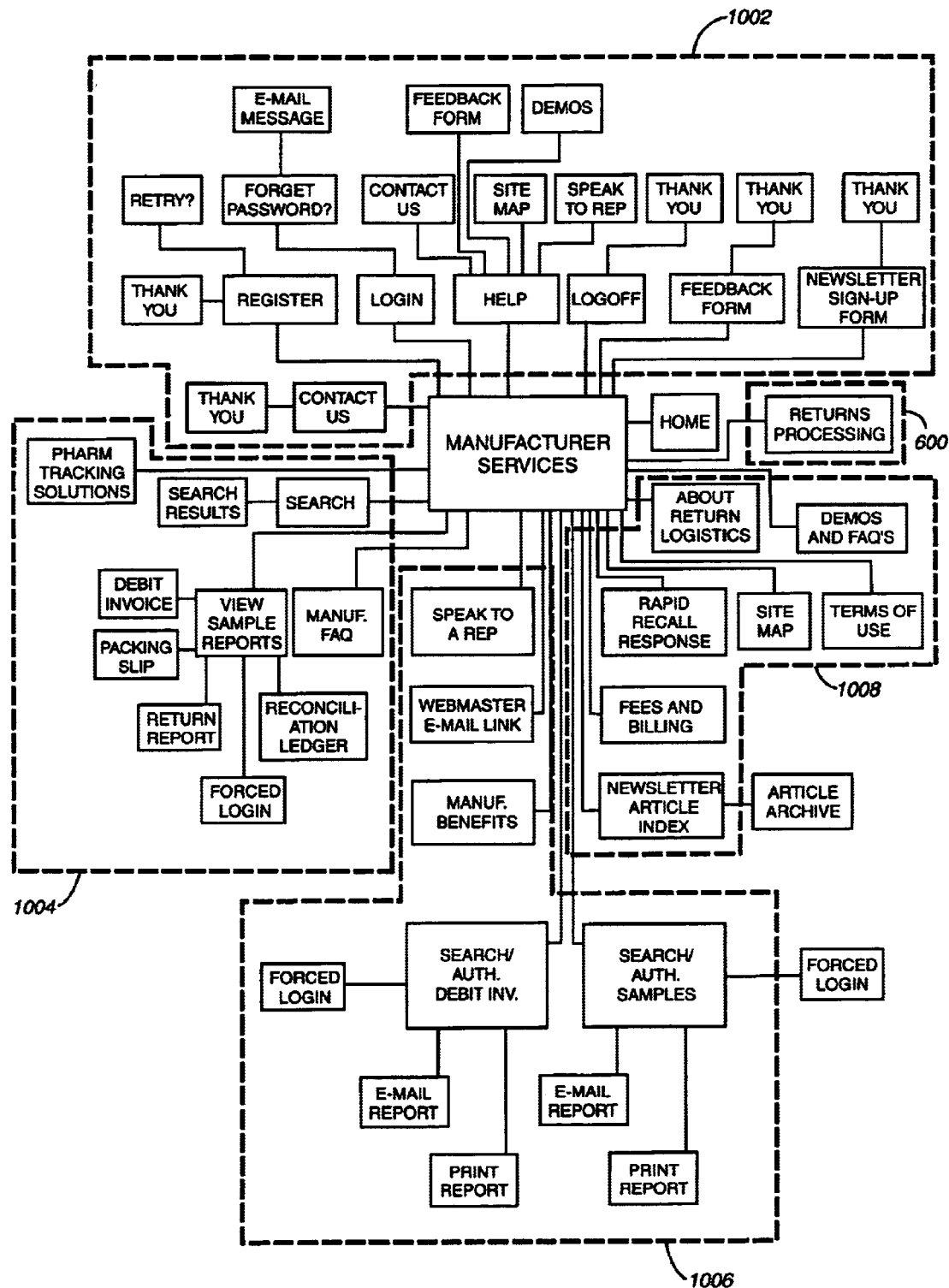
FIG. 10 is an exemplary block diagram of the overall site map of the manufacturing services group of FIG. 6, according to the present invention.

FIG. 10 is an exemplary block diagram of the overall site map 1000 of the manufacturing services group 610 of FIG. 6. The site is broken into five major groups as follows:

A login/register/logoff group/contact us group 1002 which is analogous to group 602 of FIG. 6 above.

A search group 1004, which is analogous to group 604 of FIG. 6 above.

A return group 1006, allows a store 312 using a graphical user interface to create a return processing slip as is discussed in FIG. 6 below. In a pharmaceutical embodiment for returning products, a DEA (Drug Enforcement Agency) guidelines, FDA (Food and Drug Administration) and other government agency guidelines. It is important to point out the Search Authority Samples 1010 which allows manufacturers to have samples used by a sales force returned for processing as well. For example, a pharmaceutical sales representative may have samples that are being returned because the promotion is over for the samples. The pharmaceutical representative would be seller the 312 and fill out return processing form 600 of FIG. 6.

A promotional group 1008 which is analogous to group 1008 of FIG. 6 above.

A return processing processor 600 group provides information which is described in FIG. 6 above.

Exemplary Return Processing Process Flow

The following table is a high-level flow diagram of the information being transmitted and received between the return processing server 202 and the other servers of FIG. 3, according to the present invention.

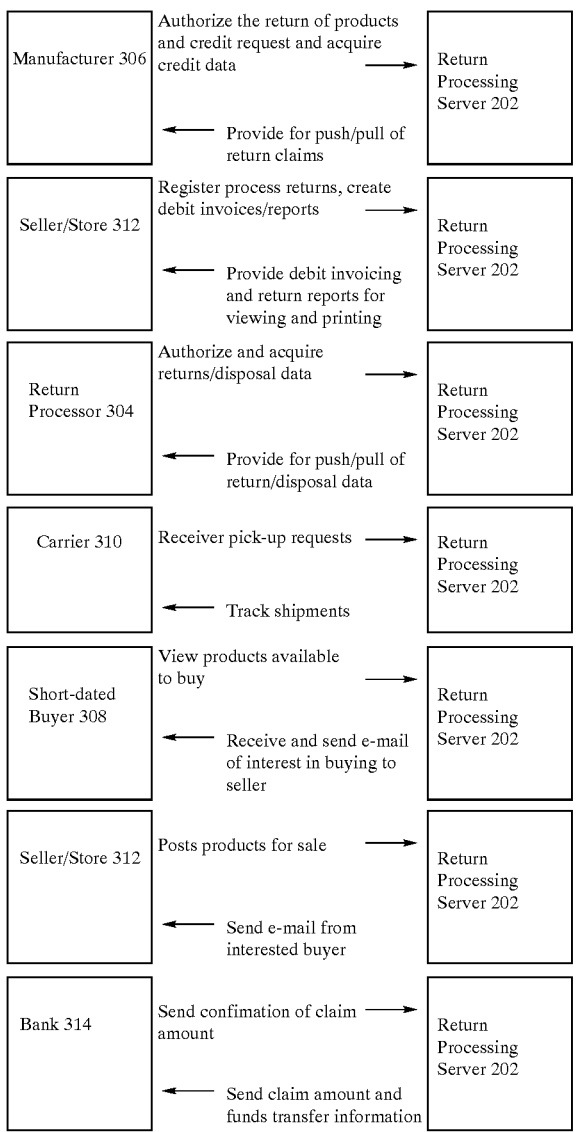

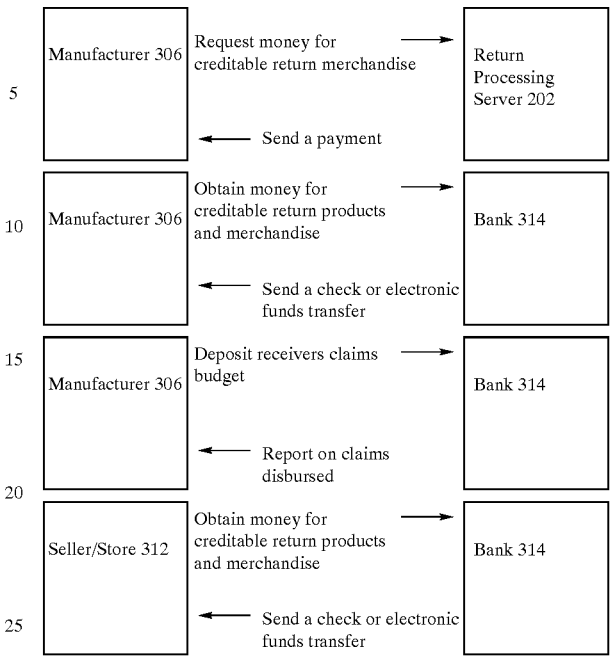

Although a specific embodiment of the invention has been disclosed, it will be understood by those having skill in the art that changes can be made to this specific embodiment without departing from the spirit and scope of the invention. The scope of the invention is not to be restricted, therefore, to the specific embodiment, and it is intended that the appended claims cover any and all such applications, modifications, and embodiments within the scope of the present invention.

What is claimed is:

1. A method in a client-server environment having a plurality of client systems coupled to a server over a network, the method on the server for managing the return processing of one or more manufacturers, the method comprising the steps of:

coupling to a database containing information about the procedures for at least one manufacturer's product;

presenting a return processing template to at least one client system coupled to the server system over a network, wherein the template comprises a graphical user interface for receiving information regarding at least one product to be submitted for return processing;

receiving the information from the at least one client system of at least one product to be submitted for return processing;

creating a debit invoice in accordance with the manufacturer's policies for the information received for return processing from the at least one client system;

placing the debit invoice in a debit invoice database accessible to the one or more manufacturer to access one or more debit invoices for processing return credit;

sending carrier shipping information, automatically using the server system, to the at least one to the at least one client system for shipping the at least one product submitted for return processing;

printing a shipping label in accordance with a third party shipping entity for shipping the at least one product submitted for return processing according to the carrier shipping information; and receiving confirmation of a claim amount from a bank for payment on the debit invoice, wherein the claim amount is based on the debt invoice.

2. The method according to claim 1, wherein the step of receiving the information from the at least one client system includes receiving the expiration date of at least one product to be submitted for return processing and further comprising the step of:

determining if at least one product to be processed for return is an expired product by comparing the expiration date with a present date; and if the at least one product is an expired product then performing the sub-steps of:

looking up the manufacturer's return policy for the product including shipping and handling instructions; and sending the manufacturer's information for the product to the at least one client system.

3. The method according to claim 1, wherein the step of receiving the information from the at least one client system includes receiving the expiration date of at least one product to be submitted for return processing and further comprising the step of:

determining if at least one product to be processed for return is an unexpired product by comparing the expiration date with a present date; and if the at least one product is an unexpired product then performing the sub-steps of:

sending a prompt to the at least one client system requesting if the product should be placed in an auction database; and placing the product in the auction database if an authorization is received from the at least one client system.

4. The method according to claim 1, wherein the step of receiving the information from the at least one client system includes receiving the expiration date of at least one product to be submitted for return processing and further comprising the step of:

determining if at least one product to be processed for return is an unexpired product by comparing the expiration date with a present date; and if the at least one product is an unexpired product then performing the sub-steps of:

sending a prompt to the at least one client system requesting if the product should be placed in donation database; and placing the product in the donation database if an authorization is received from the at least one client system.

5. The method according to claim 1, wherein the step of receiving the information from the at least one client system includes receiving information of the quantity of at least one product to be submitted for return processing.

6. The method according to claim 1, wherein the step of presenting a returns processing template further includes the sub-steps of:

receiving a product code identifier from the at least one client system;

coupling to a product database and retrieving a description of the product based on the product identifier; and presenting the description of the product based on the product identifier to the at least one client system.

7. The method according to claim 6, wherein the sub-step of presenting the description of the product based on the product identifier includes presenting an image of the product based on the product identifier.

8. The method according to claim 1, further comprising the steps of:

coupling to a return database containing information on a return; and updating the return database with the information received from the at least one client system for the at least one product submitted for return processing.

9. The method according to claim 1, further comprising the step of:

sending a notification over the network to a carrier for picking up the product to be processed for return.

10. The method according to claim 9, further comprising the steps of:

sending a packing slip to the at least one client system for shipping the product to be processed for return.

11. The method according to claim 9, further comprising the step of:

sending a notification over the network to a carrier for picking up the product to be processed for return.

12. The method according to claim 9, further comprising the step of:

sending a notification over the network to a carrier for picking up the product to be processed for return.

13. A method for managing for return processing of a plurality of products from a plurality of manufacturers over a client-server network comprising a server system coupled to a plurality of client systems, the method on the server system comprising the steps of:

presenting a return processing template to at least one client system coupled to the server system over the client-server network, wherein the template comprises a graphical user interface for receiving information regarding at least one product to be submitted for return processing;

receiving the information from the at least one client system of at least one product to be submitted for return processing;

coupling to a database containing information for return policies for one or more manufacturer's products;

determining, automatically using the server system, if the at least one product for return processing is an expired product from the information received from the at least one client system; and if the at least one product is expired performing the sub-steps of:

creating a debit invoice based upon the information received from the at least one client system of at least one product to be submitted for return processing;

sending the debit invoice to a financial representative of the manufacturer;

receiving authorization from the financial representative to process the at least one product for return processing;

sending shipping information to the at least one client system for shipping the at least one product submitted for return processing; and notifying a shipping company of the product ready for pickup from a location specified by the at least one client system; and notifying a return processing facility of an upcoming shipment of the at least one product;

and if the product is not expired performing the sub-steps of:

sending a prompt to the at least one client system requesting if the product should be placed in short-dated database; and placing the product in the short-dated database if an authorization is received from the at least one client system.

14. The method according to claim 13, wherein the step of receiving the information from the at least one client system of at least one product to be submitted for return processing includes receiving information a pharmaceutical product with an expiration date.

15. The method according to claim 13, wherein the sub-step of placing the short-dated product in the short-dated database includes placing a short-dated product in a short-dated database for auction.

16. The method according to claim 13, wherein the sub-step of placing the short-dated product in the short-dated database includes placing a short-dated product in a short-dated database for donation.

17. The method according to claim 1, wherein the step of presenting a return process template includes presenting a return processing template with pharmaceutical governmental guidelines.

18. The method according to claim 17, wherein the step of presenting a return process template includes presenting a return processing template with pharmaceutical governmental guidelines includes one of DEA (Drug Enforcement) guidelines and FDA (Food and Drug Administration) guidelines and the PDMA (Pharmaceutical Drug Market Act) guidelines.

19. The method according to claim 13, wherein the step of presenting a return process template includes presenting a return processing template with pharmaceutical governmental guidelines.

20. The method according to claim 19, wherein the step of presenting a return process template includes presenting a return processing template with pharmaceutical governmental guidelines includes one of DEA (Drug Enforcement) guidelines and FDA (Food and Drug Administration) guidelines and the PDMA (Pharmaceutical Drug Market Act) guidelines.

21. A return processing server in a client-server environment having a plurality of client systems coupled to the server over a network, for managing the return processing of one or more manufacturers, the return processing server comprising:

an interface for coupling to a database containing information about the procedures for at least one manufacturer's product;

means for presenting a return processing template to at least one client system coupled to the server system over a network, wherein the template comprises a graphical user interface for receiving information regarding at least one product to be submitted for return processing;

means for receiving the information from the at least one client system of at least one product to be submitted for return processing;

means for creating a debit invoice in accordance with the manufacturer's policies for the information received for return processing from the at least one client system;

means for placing the debit invoice in a debit invoice database accessible to the one or more manufacturer to access one or more debit invoices for processing return credit;

means for sending carrier shipping information to the at least one client system for shipping the at least one product submitted for return processing;

means for printing a shipping label in accordance with a third party shipping entity for shipping the at least one product submitted for return processing according to the carrier shipping information; and means for receiving confirmation of a claim amount from a bank for payment on the debit invoice, wherein the claim amount is based on the debt invoice.

* * * * *

UNITED STATES PATENT AND TRADEMARK OFFICE
CERTIFICATE OF CORRECTION

PATENT NO. : 6,754,637 B1
DATED : June 22, 2004
INVENTOR(S) : Brian G. Stenz

It is certified that error appears in the above-identified patent and that said Letters Patent is hereby corrected as shown below:

Title page,
Item [57], ABSTRACT,
Line 23, change "being return" to -- being returned --

Column 11,
Line 3, change "debt" to -- debit --
Line 46, change "in donation" to -- in a donation --
Line 64, change "sub-stcp" to -- sub-step --

Column 13,
Line 7, change "a pharmaceutical" to -- for a pharmaceutical --

Column 14,
Line 35, change "debt" to -- debit --

Signed and Sealed this

Seventh Day of September, 2004

JON W. DUDAS
*Director of the United States Patent and Trademark Office*